(12) United States Patent
Onuma

(10) Patent No.: US 6,891,826 B2
(45) Date of Patent: *May 10, 2005

(54) GATEWAY APPARATUS

(75) Inventor: Asahiro Onuma, Tokyo (JP)

(73) Assignee: Panasonic Communications Co., Fukuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/388,627

(22) Filed: Mar. 17, 2003

(65) Prior Publication Data

US 2003/0133442 A1 Jul. 17, 2003

Related U.S. Application Data

(63) Continuation of application No. 09/323,701, filed on Jun. 1, 1999, now Pat. No. 6,542,472.

(30) Foreign Application Priority Data

Feb. 4, 1999 (JP) .............................. 11-27093

(51) Int. Cl.[7] .............................................. H04L 12/64
(52) U.S. Cl. ...................................... 370/353; 370/356
(58) Field of Search ................................. 370/392–356

(56) References Cited

U.S. PATENT DOCUMENTS

| | | | |
|---|---|---|---|
| 5,881,233 A | | 3/1999 | Toyoda et al. |
| 6,011,794 A | | 1/2000 | Mordowitz et al. |
| 6,058,169 A | | 5/2000 | Bramnick et al. |
| 6,249,531 B1 | * | 6/2001 | Jacobi et al. ............... 370/477 |
| 6,335,927 B1 | | 1/2002 | Elliott et al. |
| 6,363,065 B1 | | 3/2002 | Thornton et al. |
| 6,404,764 B1 | * | 6/2002 | Jones et al. ................. 370/352 |
| 6,487,196 B1 | * | 11/2002 | Verthein et al. ............. 370/352 |
| 6,542,472 B1 | * | 4/2003 | Onuma ...................... 370/253 |
| 2001/0046237 A1 | * | 11/2001 | Chan et al. ................. 370/419 |
| 2002/0001301 A1 | * | 1/2002 | Sarkissian et al. .......... 370/352 |

FOREIGN PATENT DOCUMENTS

| | | |
|---|---|---|
| JP | 10276236 | 7/1997 |
| JP | 10210174 | 8/1999 |

OTHER PUBLICATIONS

Kostas, T. et al., 'Real–Time Voice Over Packet–Switched Networks', IEEE Network, Jan./Feb. 1998, pp. 18–27.*
English Lanuage Abstract of JP Appln. No. 10–210174.
English Lanuage Abstract of JP Appln. No. 10–276236.

* cited by examiner

*Primary Examiner*—Melvin Marcelo
(74) *Attorney, Agent, or Firm*—Greenblum & Bernstein, P.L.C.

(57) ABSTRACT

A communication apparatus comprises a destination obtainer that obtains a destination address, a telephone network interface that connects to a public switched telephone network and a LAN interface that connects to an Internet. Further the communication apparatus includes a communication controller, an Internet communication controller and a network communication controller. The communication controller analyzes the destination address obtained by the obtainer to determine whether communication is performed via the telephone network interface or via the LAN interface. The Internet communication controller performs voice transmission over the Internet via the LAN interface when the communication controller determines that the communication is performed via the LAN interface and the network communication controller performs voice transmission over the public switched telephone network via said telephone network interface.

8 Claims, 3 Drawing Sheets

GATEWAY APPARATUS

CROSS-REFERENCE TO RELATED APPLICATIONS

This is a continuation of U.S. application Ser. No. 09/323,701, filed Jun. 1, 1999 now U.S. Pat. No. 6,542,472, the entire disclosure of which is expressly incorporated by reference herein in its entirety.

FIELD OF THE INVENTION

The present invention relates to a communication apparatus which implements communication over an Internet phone or an ordinary telephone, facsimile communication or the like via a LAN and Internet.

DESCRIPTION OF THE RELATED ART

Recently, Internet communications are promptly becoming popular worldwide. Multiple machines which utilizes Internet, such as an Internet phone and Internet facsimile, have been proposed. Of those machines, the "Internet phone" is receiving particular attention due to its ability to significantly reduce the communication cost.

There are two modes in using this Internet phone: the first one establishes dial-up connection via an Internet service provider and the second one directly connects Internet phones to each other over a LAN.

With regard to the first mode, users who want to communicate with each other over Internet phones need to establish IP connection to each other, so that so-called meet rendezvous server should be provided on the Internet. As described in Unexamined Japanese Patent Publication No. HEI 10-210174, for example, a rendezvous server is provided with a correlation table on telephone numbers and nearest service providers. A user who is calling notifies a communication request and the IP address of the caller to a user on the receiving side (hereinafter, referred to as callee) over a public switched telephone network. The caller and the callee establish spontaneous connection and communicate with each other via the rendezvous server.

In the communication mode in which dial-up connection is made via an Internet service provider, the Internet service provider makes PPP connection of a terminal to the Internet only when connection is requested. Therefore, the ordinary Internet communication protocol cannot allow direct call to an individual to whom dial-up connection is to be established via an Internet service provider. Thus, most of proposals on Internet phones provide ways to establish mutual connection via the Internet.

For the second mode, which directly connects Internet phones to each other over a LAN, a communication scheme has been put to a practical use which uses a personal computer that is capable of coding and decoding speeches and is connected to a microphone and a loudspeaker or the like.

Communication over Internet phones using this method however requires a special device and various settings for a terminal that connects to a LAN. There have not been proposed various solutions to this shortcoming unlike in the above-described case of dial-up connection.

There is a great need to adaptively connect multiple telephones and facsimile machines, which are present within a company, a school or the like, to the Internet for their effective usage. But, no schemes to easily accomplish such a use have not been proposed yet.

Accordingly, it is an object of the present invention to provide a communication apparatus which can ensure effective use of various terminals, mutually connected over a LAN, on the Internet by connecting telephones, facsimile machines, etc. to the LAN, the Internet, a public switched telephone network or the like as needed.

SUMMARY OF THE INVENTION

A communication apparatus according to this invention comprises a terminal interface for connecting to a communication terminal, a interface for connecting to a public switched telephone network, and a LAN interface for connecting to an Internet. This communication apparatus transmits data via either the public switched telephone network interface or the LAN interface as a result of analyzing a transmission request from the communication terminal. The communication apparatus is also designed to transmit data, received via either the public switched telephone network interface or the LAN interface, to another communication terminal.

Further, the communication apparatus of this invention is so designed as to analyze received data to acquire a transmission destination or a reception terminal, and so execute a gateway process as needed, at the time of data transmission or data reception.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENT

Figure 2:
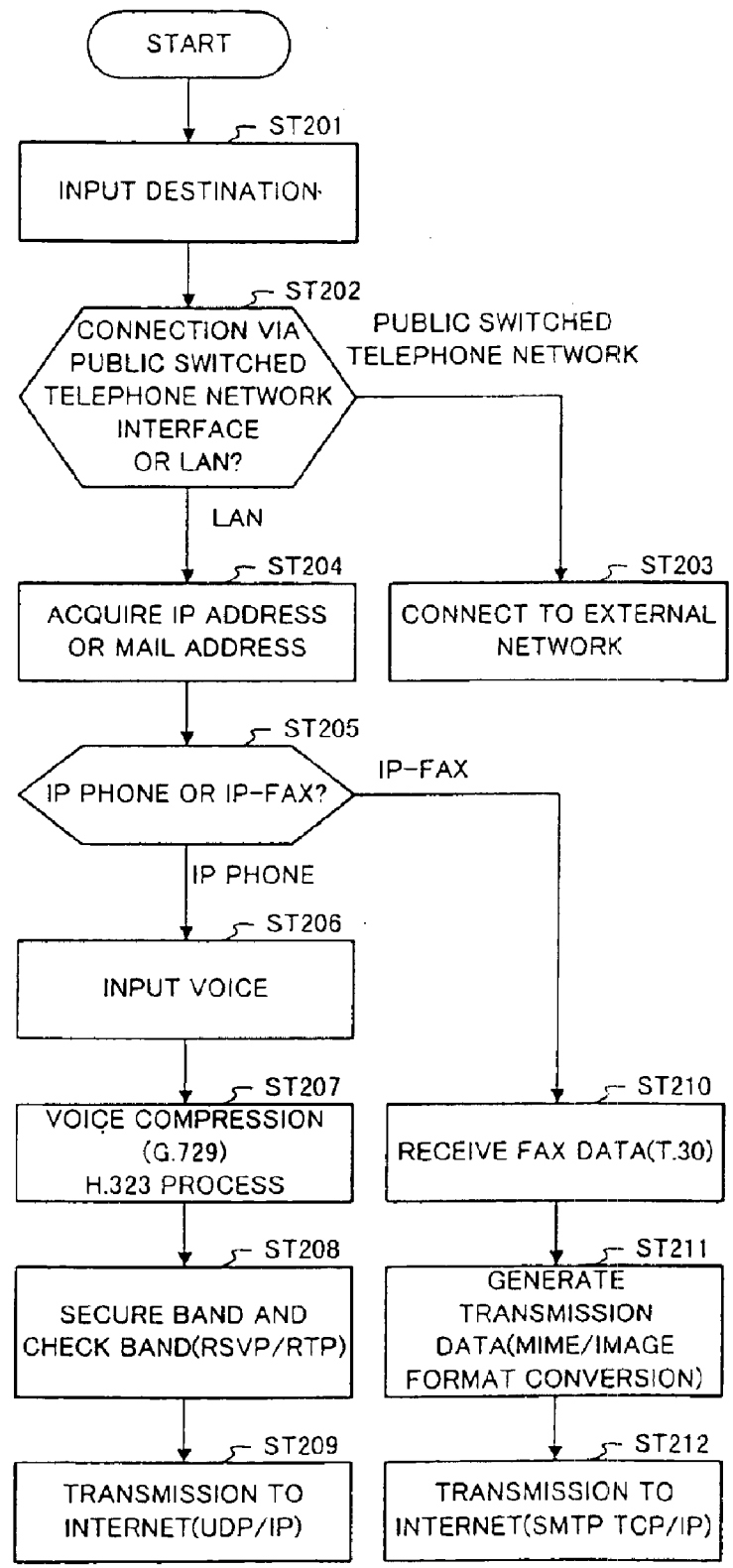
FIG. 2 is a flowchart illustrating a transmission process for the communication apparatus according to this embodiment.
Figure 3:
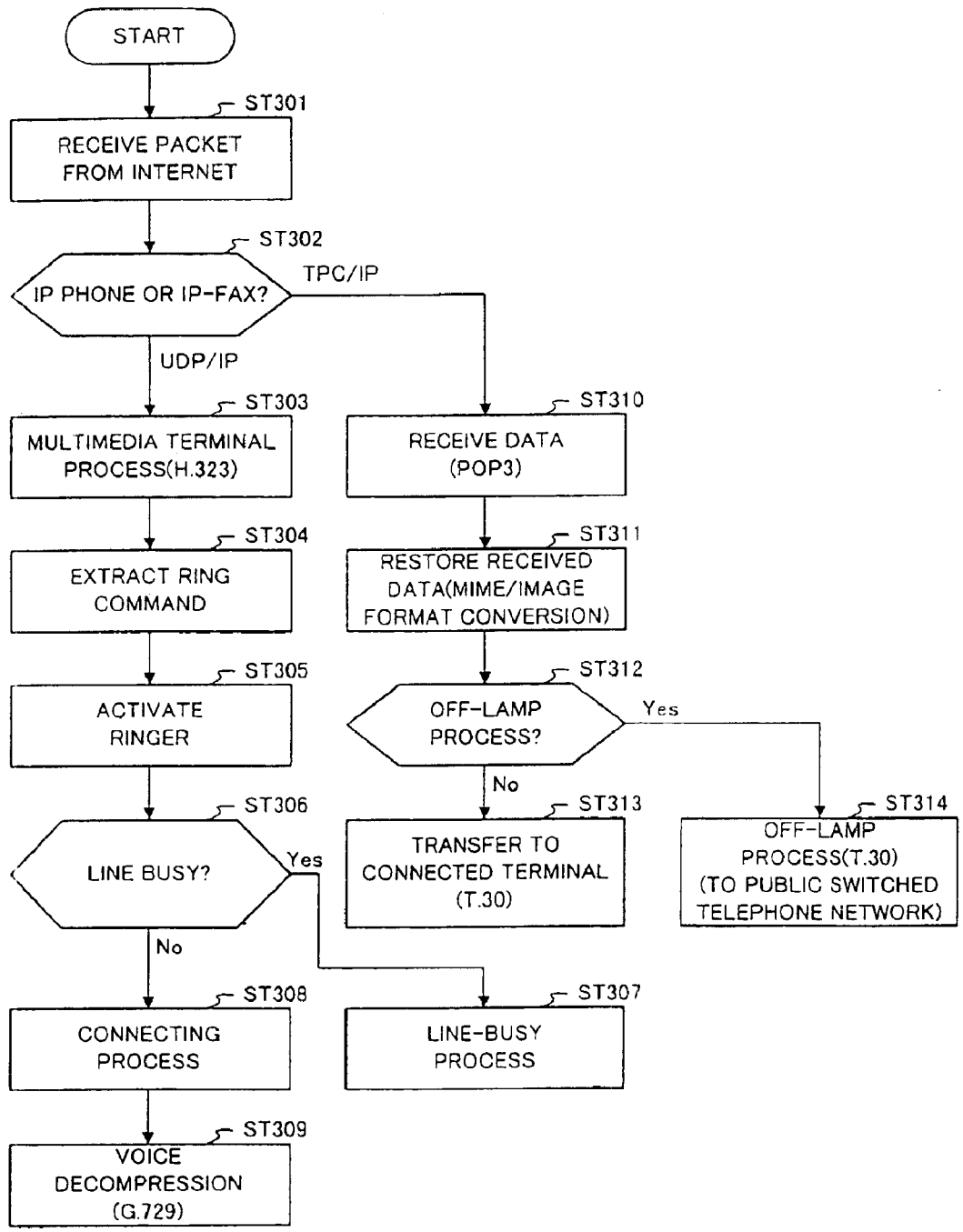
FIG. 3 is a flowchart illustrating a reception process for the communication apparatus according to this embodiment.

A communication apparatus according to one preferred embodiment of the present invention will now be described specifically with reference to FIGS. 1 through 3.

Figure 1:
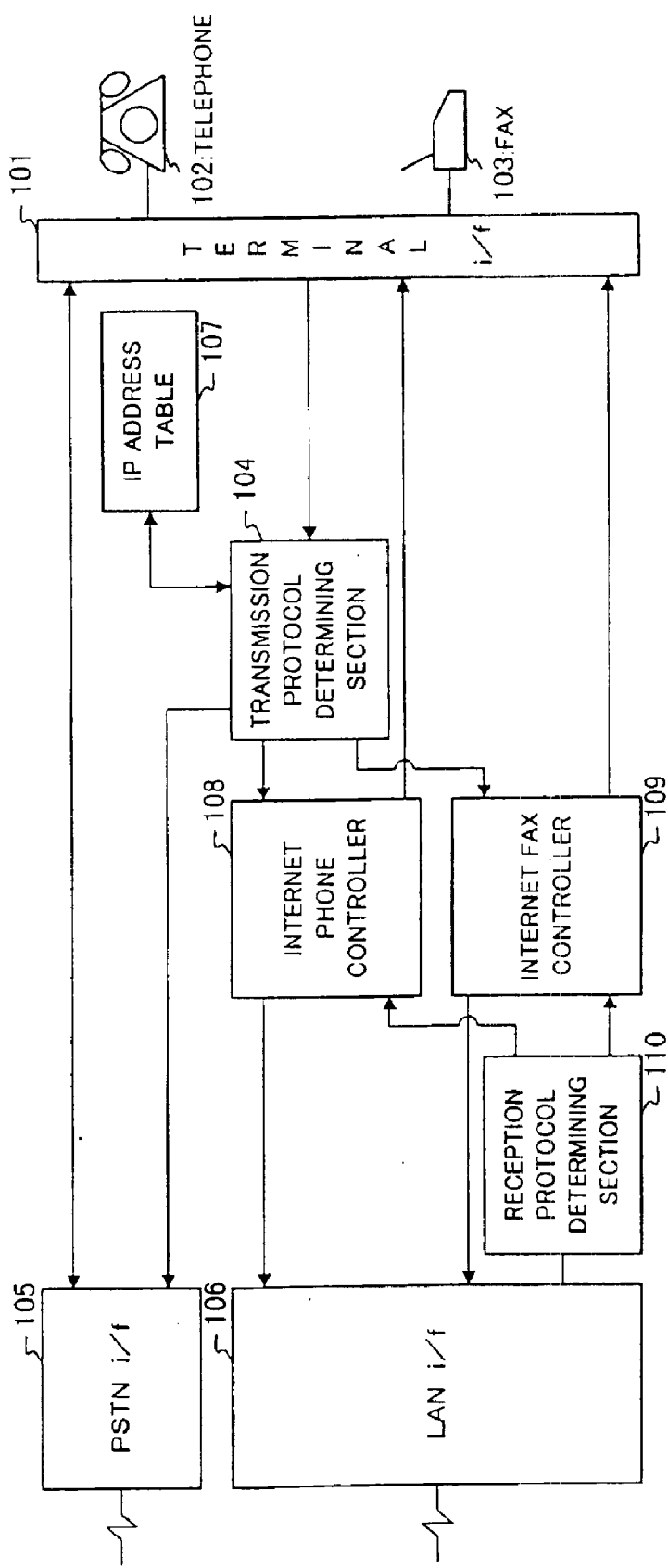
FIG. 1 is a schematic block diagram showing a communication apparatus according to one embodiment of the present invention.

FIG. 1 is a schematic block diagram showing a communication apparatus according to one embodiment of this invention.

A terminal interface 101 is an interface for an external terminal, which connects to a telephone 102 and a facsimile 103.

A transmission protocol determining section 104 identifies and determines a transmission protocol which is instructed by the telephone 102 or the facsimile 103, and connects the telephone 102 or the facsimile 103 to either a public switched telephone network interface 105 or a LAN interface 106 in accordance with the instruction. This transmission protocol determining section 104 is constructed by ordinary software.

The instruction on the transmission protocol is given by sending a code of "*" or "#" from the telephone 102 or the facsimile 103 prior to transmission from the telephone 102 or the facsimile 103. The transmission protocol determining section 104 determines an Internet phone when the code is "*," for example, or determines an Internet FAX when the code is "#," and selects the LAN interface 106. When a string of numerals different from such a special command is input, the transmission protocol determining section 104 determines the input as a telephone number and selects the public switched telephone network interface 105.

An IP address table 107, which associates telephone numbers with IP addresses, converts a telephone number coming from the telephone 102 or facsimile 103 to an associated IP address.

An Internet phone controller 108 serves to execute communication control procedures for an operator using the telephone 102 to implement an Internet phone via the LAN interface 106. This Internet phone controller 108, which is generally constructed by software, performs a H.323 protocol for voice processing and a codec process like. G.729 on voice signals input from the telephone 102 to sequentially encode the voice signals, and transmits the encoded signals in accordance with various kinds of communication protocols. For those communication protocols, standard protocols in the art, such as IP (Internet Protocol), UDP (User Datagram Protocol), RTP (Transport Protocol for Real-time application) and RSVP (Resource reservation Protocol) are used. The Internet phone controller 108 also executes a process of receiving voice data. Those protocols are known.

An Internet FAX controller 109 serves to execute communication control procedures for an operator using the facsimile 103 to implement Internet FAX transmission via the LAN interface 106. Generally, this controller 109 is also constructed by software. The Internet FAX controller 109 communicates with the facsimile 103 according to the ITU-T.30 protocol, and collectively transmits data, received from the facsimile 103, in the data form of e-mail using various kinds of communication protocols, such as IP, TPC (Transmission Control Protocol), SMTP (Simple Mail Transfer Protocol), MIME (Multipurpose Internet Mail Extension) and TIFF (Tagged Image File Format). This Internet FAX controller 109 likewise executes a process of receiving facsimile data of the MIME format. Those protocols are also known.

A reception protocol determining section 110 determines if packet data received from the LAN interface 106 over the Internet is associated with the UDP or TPC. This section 110 is also generally constructed by software. Either the Internet phone controller 108 or the Internet FAX controller 109 is selectively activated in accordance with the result of determination made by the reception protocol determining section 110. The activated controller 108 or 109 is connected to the Internet, and sends received data to the telephone 102 or the facsimile 103.

As apparent from the above, the communication apparatus embodying this invention comprises a terminal interface for connecting to a communication terminal, a public switched telephone network interface for connecting to a public switched telephone network, a LAN interface for connecting to an Internet, and communication control means for analyzing a transmission request from the communication terminal and implementing data transmission via either the public switched telephone network interface or the LAN interface, and transmitting data, received via either the public switched telephone network interface or the LAN interface, to the communication terminal. With this structure, the communication apparatus of this invention has a gateway capability and properly selects a caller and a callee. With various terminals connected to one another over a LAN, therefore, those individual terminals can be used effectively on the Internet by intentionally connecting telephones, facsimile machines, etc. to the LAN, Internet, public switched telephone network or the like.

The transmission and reception operations of the thus constituted communication apparatus will be described below referring to flowcharts illustrated in FIGS. 2 and 3.

To begin with, with reference to FIG. 2, a description will be given of procedures when the communication apparatus according to this invention implements communication with an Internet phone via the LAN interface or implements Internet FAX transmission. FIG. 2 presents a flowchart illustrating the transmission process for the communication apparatus according to this embodiment.

In step (hereinafter referred to as "ST") 201, a communication destination is input through the telephone 102 or the facsimile 103, connected to the terminal interface 101.

In ST 202, it is determined whether a connection instruction input through the telephone 102 or the facsimile 103 instructs connection to the Internet over a LAN or connection to the public switched telephone network. When the connection instruction instructs connection to the public switched telephone network, a process of connecting to an external network is carried out in ST 203.

Inputting a number through the telephone 102 or the facsimile 103 is carried out like "*01," "*02," "#01" or "#02," for example. The transmission protocol determining section 104 selects the Internet phone controller 108 when detecting "*" and selects the Internet FAX controller 109 when detecting "#." In the case of connection to the public switched telephone network, the connection instruction input through the telephone 102 or the facsimile 103 is an ordinary number, which consists only of numerals and has no an identifier affixed thereto. When detecting no identifier like "*" or "#," the transmission protocol determining section 104 determines that the connection instruction is for connection to the public switched telephone network. Since selection of the Internet phone or Internet FAX can be made only by an instruction command, it is possible to very easily implement transmission over the Internet using an ordinary telephone or facsimile.

In ST 204, the transmission protocol determining section 104 searches for, and acquires, an IP address corresponding to "*01" or "#01" by referring to the IP address table 107. Then, the transmission protocol determining section 104 sends out the acquired IP address to the Internet phone controller 108 or the Internet FAX controller 109.

In ST 205, the transmission protocol determining section 104 determines whether an Internet phone process or an Internet FAX process should be carried out. The Internet phone controller 108 is activated in the case of Internet phone process, and the Internet FAX controller 109 is activated in the case of Internet FAX process.

When the result of determination in ST 205 indicates an Internet phone, the Internet phone controller 108 executes a process of transmitting voice data to the IP address, acquired from the IP address table 107, in ST 206 to ST 209. When a voice is input in ST 206, voice compression (G.729 and H.323) is performed in ST 207. Next, a packet header, which is generated according to the UDP/IP and in which an option of band securing/band check (RSVP/RTP) is set, is affixed to compressed data that has been acquired through the compression process, and is then transmitted (ST 208 and ST 209). This UDP/IP is a protocol for connection-less data transmission, and transmitted data goes through a router and directly reaches a terminal with the designated IP address. Thereafter, mutual communication is implemented by the UDP/IP protocol.

Communication is also possible when a receiving terminal is the communication apparatus embodying this invention. In this case, even when both the calling terminal and the receiving terminal are ordinary telephones, the use of the communication apparatus of this invention can ensure communication over the Internet. A process in a case where the communication apparatus of this invention is used on the receiving side will be discussed later.

In the H.323 process which is executed with the first packet of the UDP/IP, a calling sequence process like a Q command is carried out to activate the ringer in the receiving terminal prior to inputting of voice data.

When the result of determination in ST 205 indicates an Internet FAX, the Internet FAX controller 109 performs a process of transmitting facsimile data in ST 210 to ST 212. First, the Internet FAX controller 109 temporarily receives all transmitted data from the facsimile 103 according to the ITU-T.30 protocol (ST 210).

Next, the Internet FAX controller 109 forms the received data in the TIFF (Tagged Image File Format), then formats the resultant data as an appended file of e-mail in accordance with the MIME format (ST 211). This facsimile data formatted as e-mail is transmitted using the SMTP or TCP/IP which is an e-mail communication protocol (ST 212).

A description will now be given of reception procedures when the communication apparatus according to this invention accepts a call from an Internet phone via the LAN interface or implements Internet FAX reception with reference to FIG. 3. FIG. 3 presents a flowchart illustrating the reception process for the communication apparatus according to this embodiment.

In ST 301, the communication apparatus receives packet data over the Internet via the LAN interface 106.

In ST 302, the reception protocol determining section 110 analyzes the received packet header, and connects the Internet to the Internet phone controller 108 and activates the Internet phone control means when the received packet header is of the UDP/IP. When the received packet header is of the TCP/IP, the reception protocol determining section 110 connects the Internet to the Internet FAX controller 109 and activates the Internet FAX control means.

As apparent from the above, the reception protocol determining section 110 analyzes a packet received via the LAN interface, and selectively activates the Internet phone control means or the Internet FAX control means at the time of reception. More specifically, the communication apparatus embodying this invention analyzes a packet received via the LAN interface according to whether the communication protocol is the UDP/IP or TCP/IP, and activates the Internet phone control means when the communication protocol is the UDP/IP while it activates the Internet FAX control means when the communication protocol is the TCP/IP. Therefore, the reception protocol determining section 110 can surely and easily determine a receiving terminal from a received packet, and can easily implement communication to an ordinary telephone, facsimile or the like over the Internet.

ST 303 to ST 309 illustrate the procedures when the callee is an Internet phone. In ST 303 and ST 304, a multimedia terminal process is executed according to the H.323 protocol to extract a ring command for the receiving terminal from the received signal. In ST 305, the Internet phone controller 108 activates the ringer in the telephone 102.

In ST 306, the Internet phone controller 108 checks if the telephone 102 is busy. When the telephone 102 is busy, the Internet phone controller 108 sends a line-busy signal to the calling terminal in a line-busy process in ST 307.

When the telephone 102 is not busy, the telephone receiver is set off-hook, then a process of connecting the Internet to the telephone 102 is carried out in ST 308.

In ST 309, the Internet phone controller 108 sequentially performs voice decompression on the packet data from the caller (G.729), then goes to the UDP/IP communication mode.

ST 310 to ST 314 illustrate the procedures when the result of determination by the reception protocol determining section 110 in ST 302 indicates the callee as an Internet FAX.

In ST 310, data reception is performed using the POP3 as in the case of reception of e-mail data. That is, the reception protocol determining section 110 discriminates whether the received data is communication data to an Internet phone or is coming from an Internet FAX by analyzing the packet data acquired from a server via the LAN interface according to the POP3 protocol.

In ST 311, the received data is restored. More specifically, the Internet FAX controller 109 analyzes the header of the e-mail data received in the MIME format to identify the destination and the caller, and restores image data from the appended TIFF file.

In ST 312, it is determined if the destination for the data analyzed in ST 311 is "off-lamp" which is a process of transferring received data over the public switched telephone network. The IP header of the received packet is described like "onuma@aaa.co.jp" or "okiyama#03-1234-7088@aaa.co.jp," for example. When a code sequence "#03-1234-7088" is detected in the mail address, the Internet FAX controller 109 determines that the caller has given an off-lamp instruction. This instruction mode, whose standardization is currently in progress, may take any form.

When the result of determination in ST 312 indicates no off-lamp instruction, the Internet FAX controller 109 transmits the received data to the facsimile 103 according to the T.30 protocol in ST 313.

When the result of determination in ST 312 indicates an off-lamp instruction, i.e., when a code sequence like "#03-1234-7088" is present in the mail address, in ST 314, the Internet FAX controller 109 transmits facsimile data to the external destination "03-1234-7088" via the terminal interface 101 and the public switched telephone network interface 105 according to the T.30 protocol.

According to this embodiment, interfaces between the individual controllers and external networks include the terminal interface, the public switched telephone network interface and the LAN interface. A LAN card, PCMCIA, cross-point mixer and so forth can however be used as interfaces between the individual controllers and external networks as needed.

As described above, the communication apparatus of this invention performs a gateway process for both transmission and reception, and can take the proper routing in both transmission and reception. Therefore, this communication apparatus can implement, very easily, transmission to the Internet from an ordinary telephone or facsimile, transmission to an ordinary telephone or facsimile from the Internet, and transmission of data received over the Internet to another facsimile machine.

The present invention is not limited to the above described embodiments, and various variations and modifications may be possible without departing from the scope of the present invention.

This application is based on the Japanese Patent Application No.HEI 11-27093 filed on Feb. 4, 1999, entire content of which is expressly incorporated by reference herein.

What is claimed is:

1. A gateway apparatus comprising:
a terminal interface configured to be connected with a telephone;
a LAN interface configured to be connected with a LAN;
a public switched telephone network interface configured to be connected with the public switched telephone network; and
a controller configured to determine whether a predetermined character is input from the terminal interface, to connect the terminal interface with the public switched telephone network interface when the predetermined character is determined to be input, and to perform a telecommunication via the public switched telephone network,
the controller being further configured to connect the terminal interface with the LAN interface when the predetermined character is determined not to be input from the terminal interface and to perform a telecommunication via the LAN.

2. The gateway apparatus according to claim 1, wherein the predetermined character input from the terminal interface includes at least one of "*" and "#".

3. The gateway apparatus according to claim 1, wherein the predetermined character input from the terminal interface includes a predetermined sequence of characters.

4. The gateway apparatus according to claim 1, wherein the controller is further configured, when the terminal interface is connected with the LAN interface, to receive a voice input from the telephone via the terminal interface, to compress the received voice by utilizing voice compression in accordance with ITU Recommendation G.729, to configure the compressed voice for Internet communication, and to output the configured voice to a recipient via the LAN.

5. The gateway apparatus according to claim 4, wherein said controller further controls a connection with the recipient via the LAN by utilizing a protocol in accordance with ITU Recommendation H.323.

6. The gateway apparatus according to claim 4, wherein said controller further configures the compressed voice for Internet communication, by setting the compressed voice in a packet data including a packet header, the packet header capable of being configured for securing a band and checking a band, based on the RSVP/RTP protocol.

7. The gateway apparatus according to claim 4, wherein said controller further configures the compressed voice for Internet communication and outputs the configured voice to a recipient via the LAN, based on the UDP/IP protocol.

8. A gateway apparatus comprising:
a terminal interface configured to be connected with a telephone;
a LAN interface configured to be connected with a LAN;
a public switched telephone network interface configured to be connected with the public switched telephone network; and
a controller configured to determine whether a predetermined character is input from the terminal interface, to connect the terminal interface with the public switched telephone network interface when the predetermined character is not determined to be input, and to perform a telecommunication via the public switched telephone network,
the controller being further configured to connect the terminal interface with the LAN interface when the predetermined character is determined to be input from the terminal interface and to perform a telecommunication via the LAN.

* * * * *